(12) United States Patent
Krostue et al.

(10) Patent No.: US 8,282,326 B2
(45) Date of Patent: Oct. 9, 2012

(54) CARGO RESTRAINT TIE DOWN

(75) Inventors: Samantha Jo Krostue, Fisher, MN (US); Peter William Barfknecht, Embarrass, MN (US); Justin Daniel Williams, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 274 days.

(21) Appl. No.: 12/433,523

(22) Filed: Apr. 30, 2009

(65) Prior Publication Data
US 2009/0274532 A1 Nov. 5, 2009

Related U.S. Application Data

(60) Provisional application No. 61/049,872, filed on May 2, 2008.

(51) Int. Cl.
*B60P 7/08* (2006.01)

(52) U.S. Cl. ........ 410/104; 410/101; 410/102; 410/105; 410/111

(58) Field of Classification Search ............ 410/77, 410/80, 104, 105, 8, 102, 106; 244/188.1
See application file for complete search history.

(56) References Cited

U.S. PATENT DOCUMENTS

| | | | |
|---|---|---|---|
| 2,742,874 A * | 4/1956 | Patterson, III | 114/251 |
| 3,262,588 A | 7/1966 | Davidson | |
| 3,306,234 A | 2/1967 | Hansen | |
| 3,392,954 A | 7/1968 | Malitte | |
| 3,465,998 A * | 9/1969 | Ginn | 410/77 |
| 3,652,050 A | 3/1972 | Marrujo | |
| 3,765,637 A | 10/1973 | Watts | |
| 3,842,754 A * | 10/1974 | Jones | 410/12 |
| 3,986,459 A | 10/1976 | Riley | |
| 4,062,298 A * | 12/1977 | Weik | 410/105 |
| 4,230,432 A * | 10/1980 | Howell | 410/102 |
| 4,273,486 A * | 6/1981 | Tatina | 410/103 |
| 4,396,175 A | 8/1983 | Long | |
| 4,493,470 A | 1/1985 | Engel | |
| 4,776,533 A | 10/1988 | Sheek | |
| 5,449,132 A * | 9/1995 | Gilbert | 244/122 R |
| 5,573,359 A * | 11/1996 | Moradians | 410/69 |
| 5,871,318 A * | 2/1999 | Dixon et al. | 410/105 |
| 6,030,159 A * | 2/2000 | Herrick et al. | 410/102 |
| 6,318,938 B1 * | 11/2001 | Araujo | 410/79 |
| 6,425,717 B1 | 7/2002 | Saggio | |
| 6,644,901 B2 * | 11/2003 | Breckel | 410/104 |
| 2005/0008443 A1 | 1/2005 | Eitzenberger et al. | |

FOREIGN PATENT DOCUMENTS

WO 02100718 A1 12/2002

OTHER PUBLICATIONS

Official Action (DE 10 2009 018 487.2), dated Jun. 7, 2011, pp. 1-8.
Translation of Official Action (DE 10 2009 018 487.2), dated Jun. 7, 2011, pp. 1-6.

* cited by examiner

*Primary Examiner* — Glenn Dayoan
*Assistant Examiner* — Sunsurraye Westbrook
(74) *Attorney, Agent, or Firm* — Womble Carlyle

(57) ABSTRACT

A tie down for securing objects in an aircraft having a roller tray can comprise a tie-fitting, a carriage, and protruding elements. A carriage can include at least one side wall with protruding elements extending from the side wall of a carriage to cooperate with a roller tray. The protruding elements removably secure the tie down to a selected location along the roller tray. A restraint extending from an object can be removably secured to a tie down. The tie down being vertically insertable and removable by hand operation and without the use if tools or mechanical fasteners.

26 Claims, 10 Drawing Sheets

CARGO RESTRAINT TIE DOWN

RELATED APPLICATION

This application claims the benefit of priority of U.S. Appln. Ser. No. 61/049,872, filed May 2, 2008, the disclosure of which is hereby incorporated by reference in its entirety.

FIELD OF THE INVENTION

The invention is directed to tie downs for securing cargo in aircraft.

BACKGROUND

Stabilizing cargo during shipment and minimizing cargo changeover time between shipments are objectives of aircraft cargo transport systems. Typically, cargo shipped by air is first loaded onto specially configured pallets or into specially configured containers, commonly referred to as Unit Load Devices ("ULDs"). To facilitate movement of a ULD within an aircraft cargo compartment as the ULD is loaded, stowed, and unloaded, the deck of an aircraft cargo compartment typically includes a number of raised roller elements. These roller elements often include elongated roller trays that extend longitudinally along the length of the cargo deck, ball panel units, and the like. Once a ULD is in its final stowed position, the ULD must be restrained against both vertical and lateral movement during flight. Accordingly, the deck and sidewalls of a cargo compartment typically include a plurality of restraint devices attached at various installation points located on the deck and sidewalls that engage and secure a ULD. The installation points can be points within or along the elongated roller tray.

Two devices typically used to secure ULDs during shipment are primary and supplement restraint devices. Primary restraint devices are stationary and positioned at predetermined installation points on a cargo deck. Installation points coincide with cargo deck locations having features for receiving and retaining a restraint such as recesses, holes, slots, pins, cutouts, roller trays or the like. One example of a primary restraint is a latch that is removably fixed to an installation point and is selectively movable between a deployed (latched) position and a retracted (unlatched) position. The deployed latch receives a restraint, such as a strap. The retracted latch permits movement a ULD during loading and stowage. Primary restraints typically require tools to both engage and remove the restraint from an installation point. In addition, ancillary parts are also required.

Supplemental restraints add stability to ULDs and work cooperatively with primary restraint devices. Supplemental devices are moveable, engage a stowed ULD, and can be secured to any location capable of receiving a supplement restraint. Typically, supplemental restraints require tools for engagement and removal from an install point. In addition, ancillary parts may be required. Some have attempted to use the elongated seat track, capable of receiving a supplemental restraint, located adjacent to a roller tray on a cargo deck. Others combine a supplement and primary restraint device in one apparatus. However, ideal supplemental restraints give flexibility to a user to secure ULDs based on the circumstances of loading and stowage. Thus, the attachment of supplemental restraints may be best determined by which location best minimizes lateral or longitudinal movement of a ULD.

A need has arisen to develop supplemental restraint devices that augment primary restraints, require minimal tools, do not require ancillary parts, can be removed and secured in minimal time, and can be incorporated into an existing cargo system infrastructure.

DESCRIPTION

Certain exemplary embodiments of the present invention are described below and illustrated in the accompanying Figures. The embodiments described are only for purposes of illustrating embodiments of the present invention and should not be interpreted as limiting the scope of the invention. Other embodiments of the invention, and certain modifications and improvements of the described embodiments, will occur to those of skill in the art, and all such alternate embodiments, modifications and improvements are within the scope of the present invention.

Figure 1:
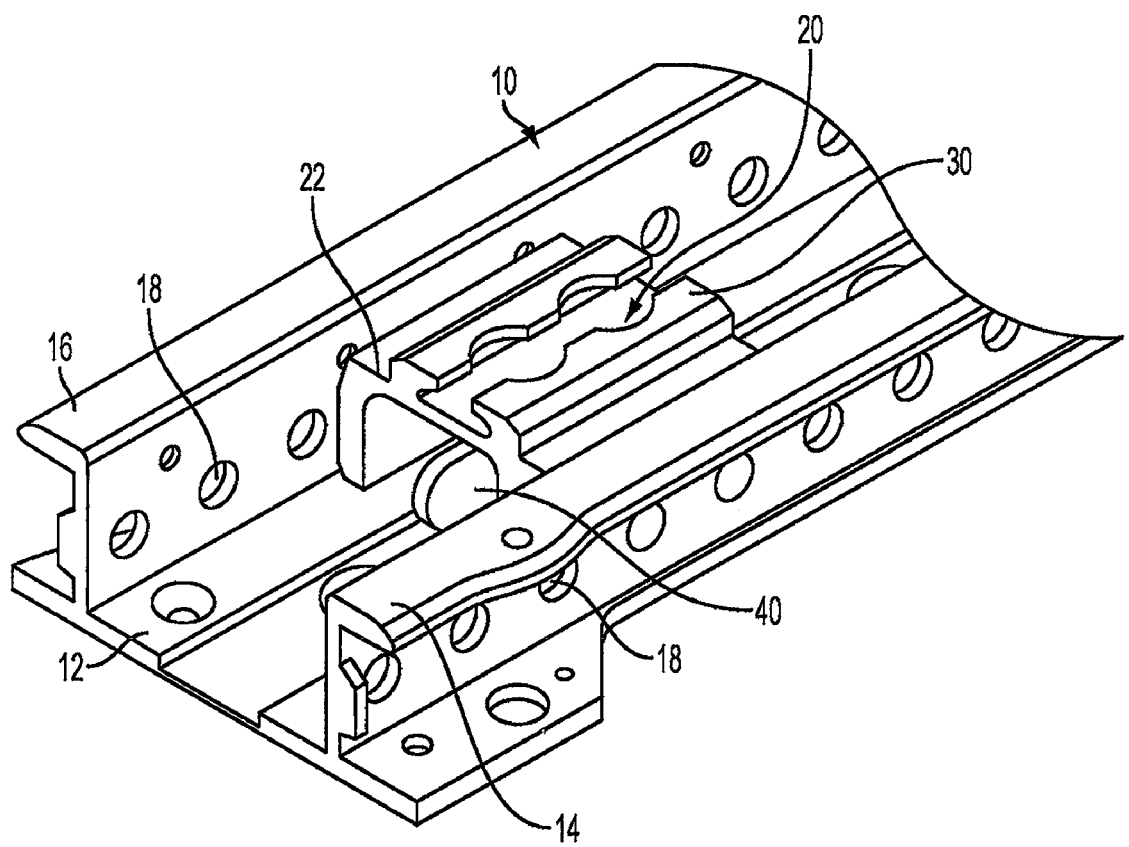
FIG. 1 is a top perspective view of a tie down in a roller tray.
Figure 2:
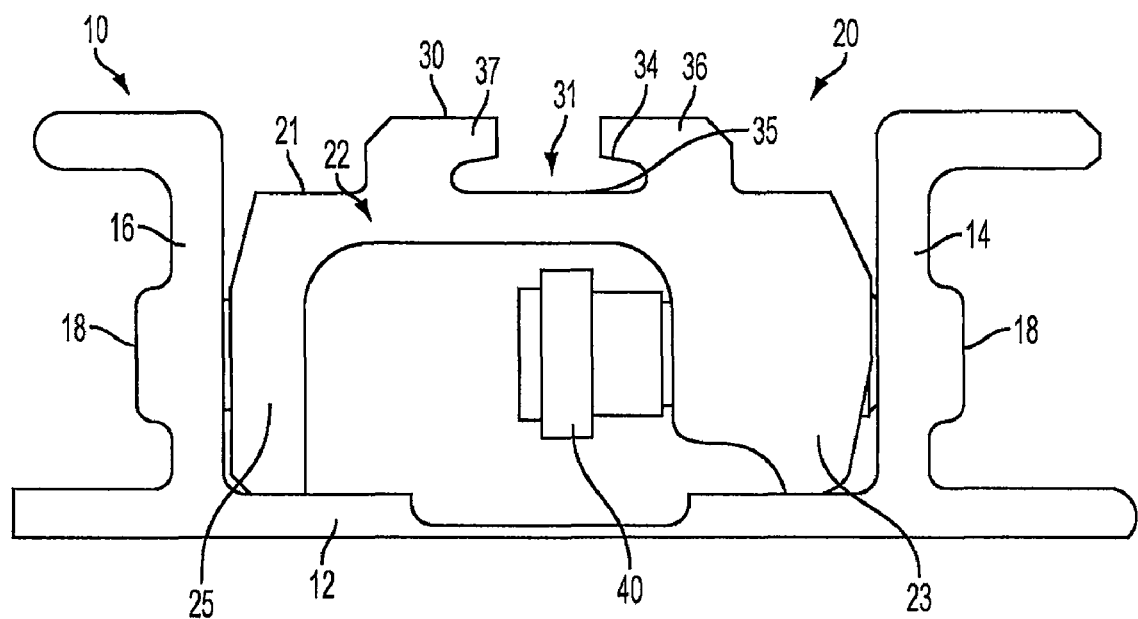
FIG. 2 shows a side view of tie down in a roller tray.

FIGS. 1 and 2 show an embodiment of roller tray 10 and tie down 20. Longitudinally arranged on a cargo deck in an aircraft, roller tray 10 receives carriage 22 within the opposing first 14 and second 16 rails. Opposing first 14 and second 16 rails extend upwardly from a roller tray base 12. Openings 18 can be aligned longitudinally down the length of each rail (14 and 16) at approximately consistent heights above roller tray base 12. The height and distance between adjacent openings 18 facilitating placement and removal of tie down 20, as will be discussed below.

Figure 3:
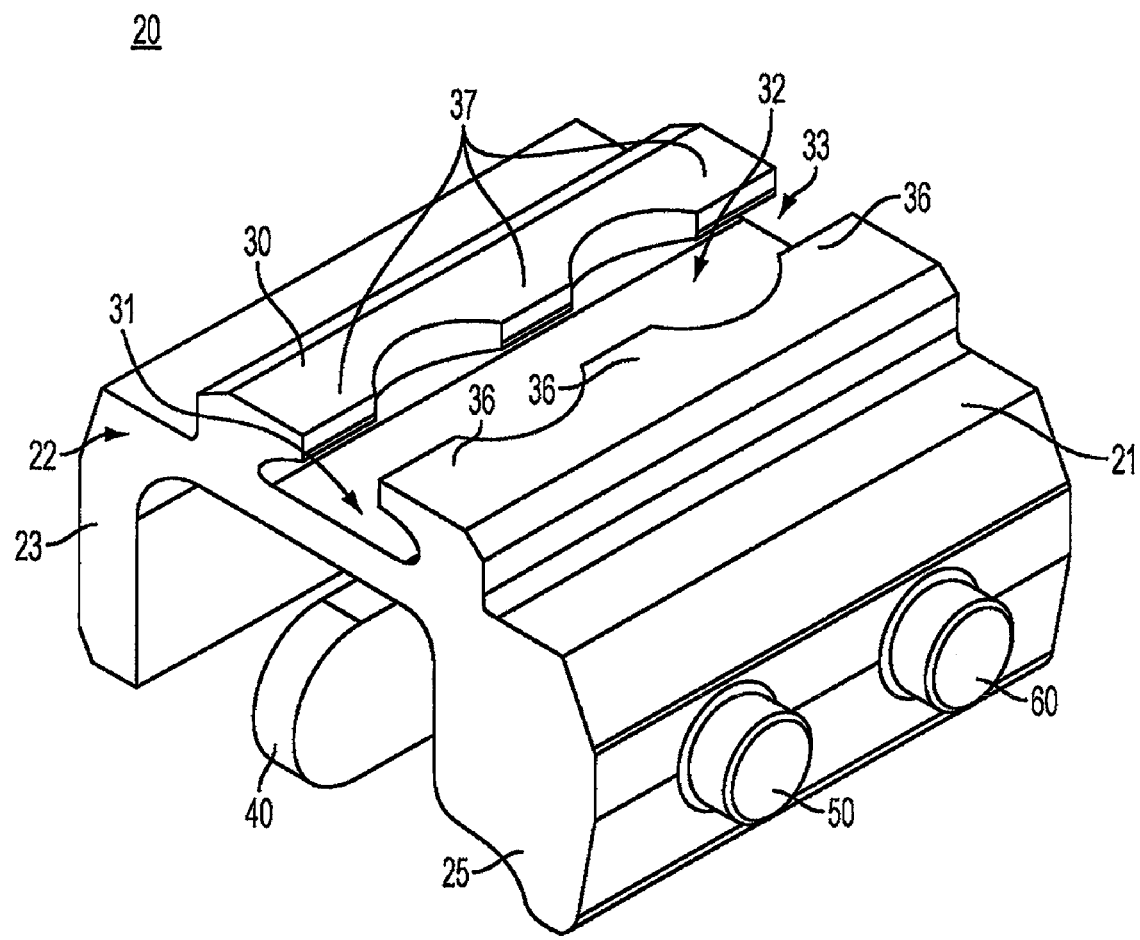
FIG. 3 shows a top perspective view of a tie down.

FIG. 2 shows carriage 22 between opposing first 14 and second 16 rails with protruding elements (elements 50, 60 shown in FIG. 3) extending into openings 18. A carriage 22 thus engages roller tray 10 and can have a fitting 30. A carriage 22 can have a size less than the distance between any portion of first 14 and second 16 rails that permit its removal from, and placement at, any point along roller tray 10. Carriage 22 can have first and second side walls, 23, 25, respectively. First and second side walls 23, 25, extend downward from carriage top 21 and engage a portion of first 14 and second 16 rails of roller tray 10. Fitting 30 on carriage 22 can be designed to receive a restraint such as a strap, chain, rope, cord, braid, cable, or tie.

Figure 4:
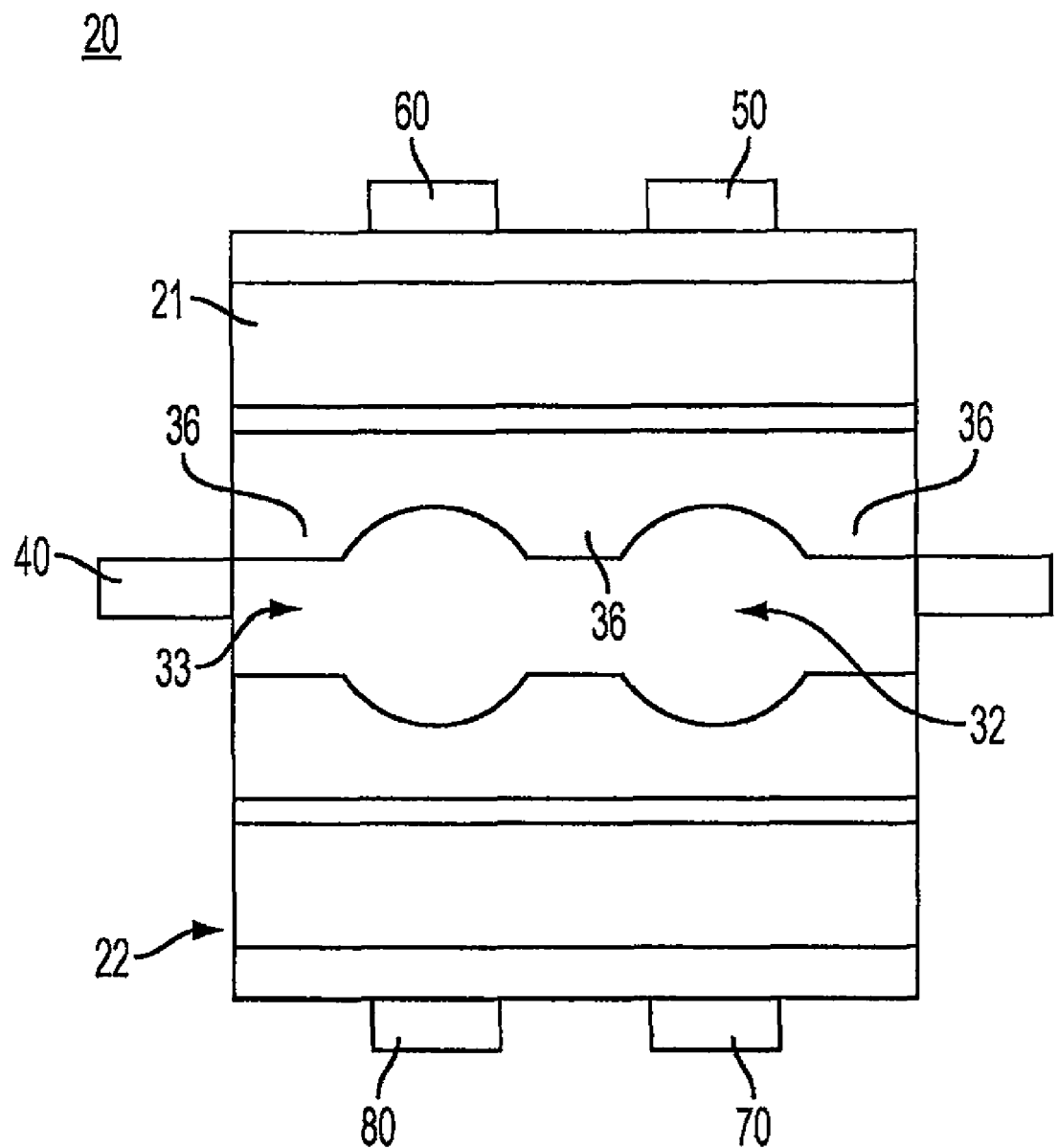
FIG. 4 is a top view of a tie down.
Figure 5:
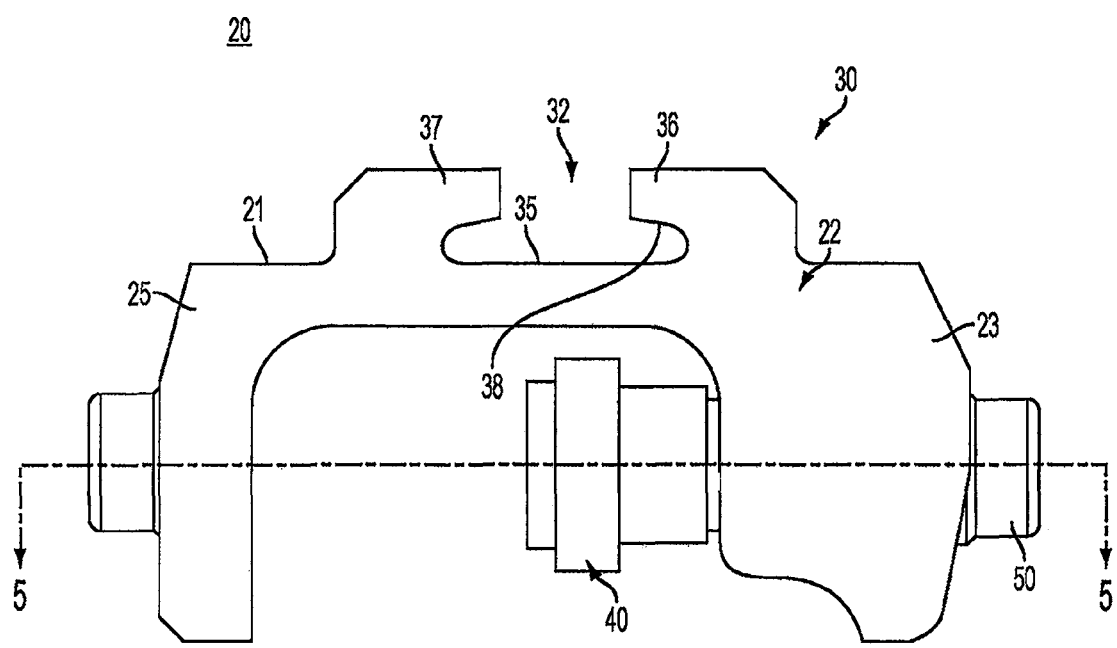
FIG. 5 is a side view of a tie down.

A tie down 20 refers to a device that can receive a restraint. A tie down 20 can include a carriage 22 and fitting 30. In the embodiment shown, in FIGS. 2, 3 and 4, fitting 30 can have a track 31, upper 34 and bottom 35 surfaces, and first 36 and second 37 retaining tabs. First and second retaining tabs, 36, 37, respectively, extend up from and over bottom surface 35 to form upper surface 34, gap 33 and fitting opening 32. Fitting opening 32 can have a width about equal to the width of track 31 and can be shaped to receive first 91 or second 92 studs (as will be discussed below).

A handle 40 positioned in one parallel embodiment and adjacent to a first side wall 23 of carriage 22 can be movable to engage and/or disengage carriage 22 from roller tray 10 (as shown in FIGS. 8A, 8C, 8B and 8D). A roller tray 10, carriage 22 and fitting 30 can be formed from aluminum, stainless steel, metal alloys, composites structures or other suitable materials. A preferable material for carriage 22 can be aluminum 7136-TZ651 1, having an anodized finish, as is known in the art.

One embodiment combines fitting 30 on carriage 22 and protruding elements 50, 60, 70 and 80 to secure a restraint to roller tray 10 as shown in FIGS. 3, 4, 5 and 7. Protruding elements 50, 60, 70 and 80 engage openings 18 to removeably secure carriage 22 to roller tray 10. A combination of movable (50, 60) and fixed (70, 80) protruding elements allow a user to selectively move and secure carriage 22 to roller tray 10. A protruding element refers to a projection that is capable of engaging an opening. As shown in FIGS. 3 through 6, carriage 22 can have first 50 and second 60 moveable protruding elements extending through a first side wall 23 to engage openings 18 in a first rail 14 of roller tray 10. First 50 and second 60 movable protruding elements can be positioned in first side wall 23 at about the same height above the base of first side wall 23 of carriage 22. The height of first 50 and second 60 movable protruding elements above the base of first side wall 23 can be about equal to the height of openings 18 above roller tray base 12. The distance between first 50 and second 60 movable protruding elements can be about equal to the distance between two adjacent openings 18 on a first rail 14 of roller tray 10. Thus, the moveable protruding elements 50 and 60 can be designed to engage openings 18 of roller tray 10. FIGS. 3, 4, 5 and 6 show two movable protruding elements, however, the inventors contemplate that more or less than two movable protruding elements can be used. For example, three, four or more moveable protruding elements can be used. In addition, moveable protruding elements (50, 60) can be used on either first side wall 23 or a second side wall 25. The protruding elements (50, 60, 70 and 80) can be formed from aluminum, stainless steel, metal alloys, composites structures or other suitable material. A preferable material for protruding elements can be aluminum 713 6-TZ65 11 having an anodized finish, as is known in the art.

Figure 6:
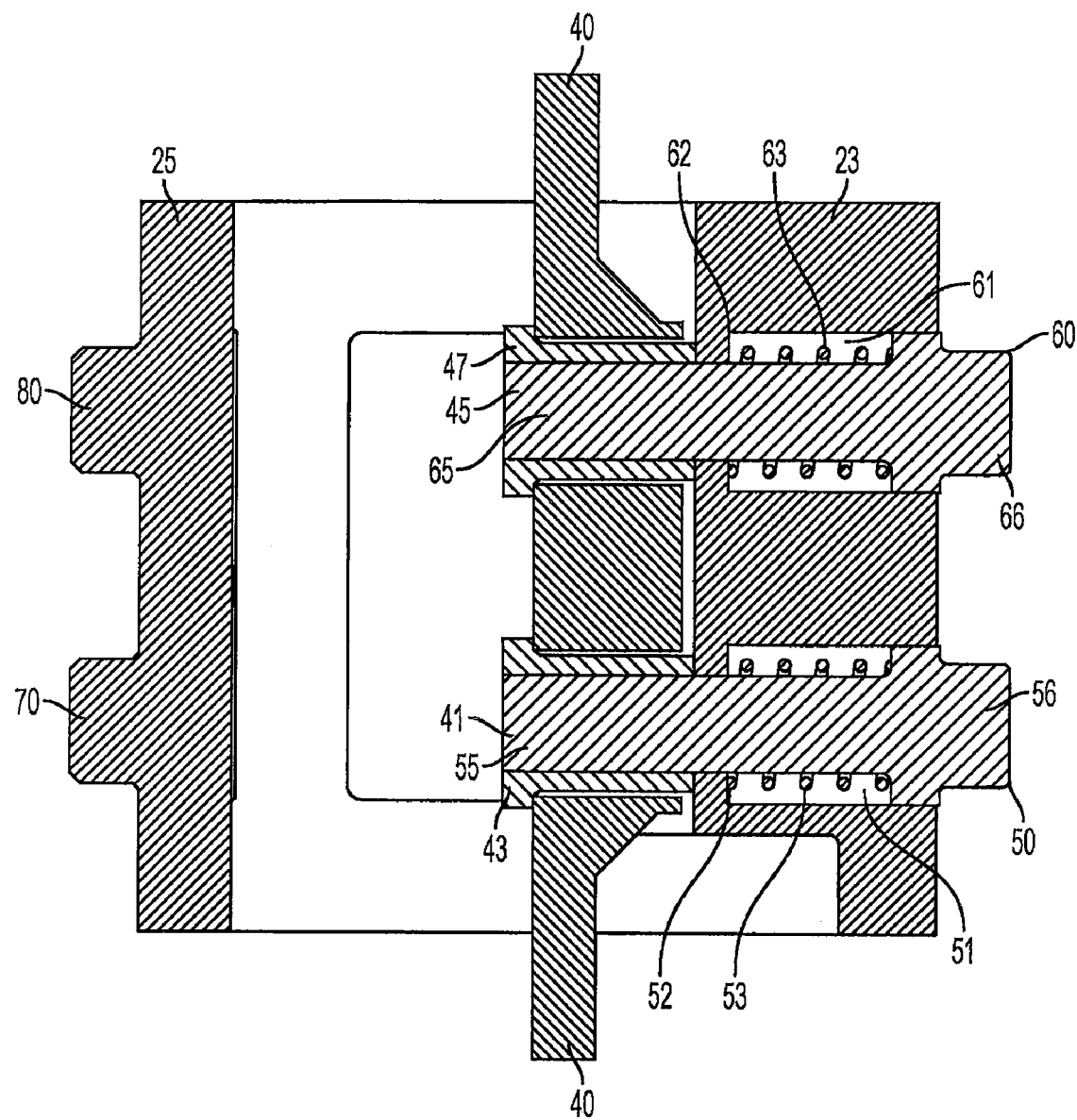
FIG. 6 shows a cross-section of FIG. 5 taken along line 5-5.
Figure 7:
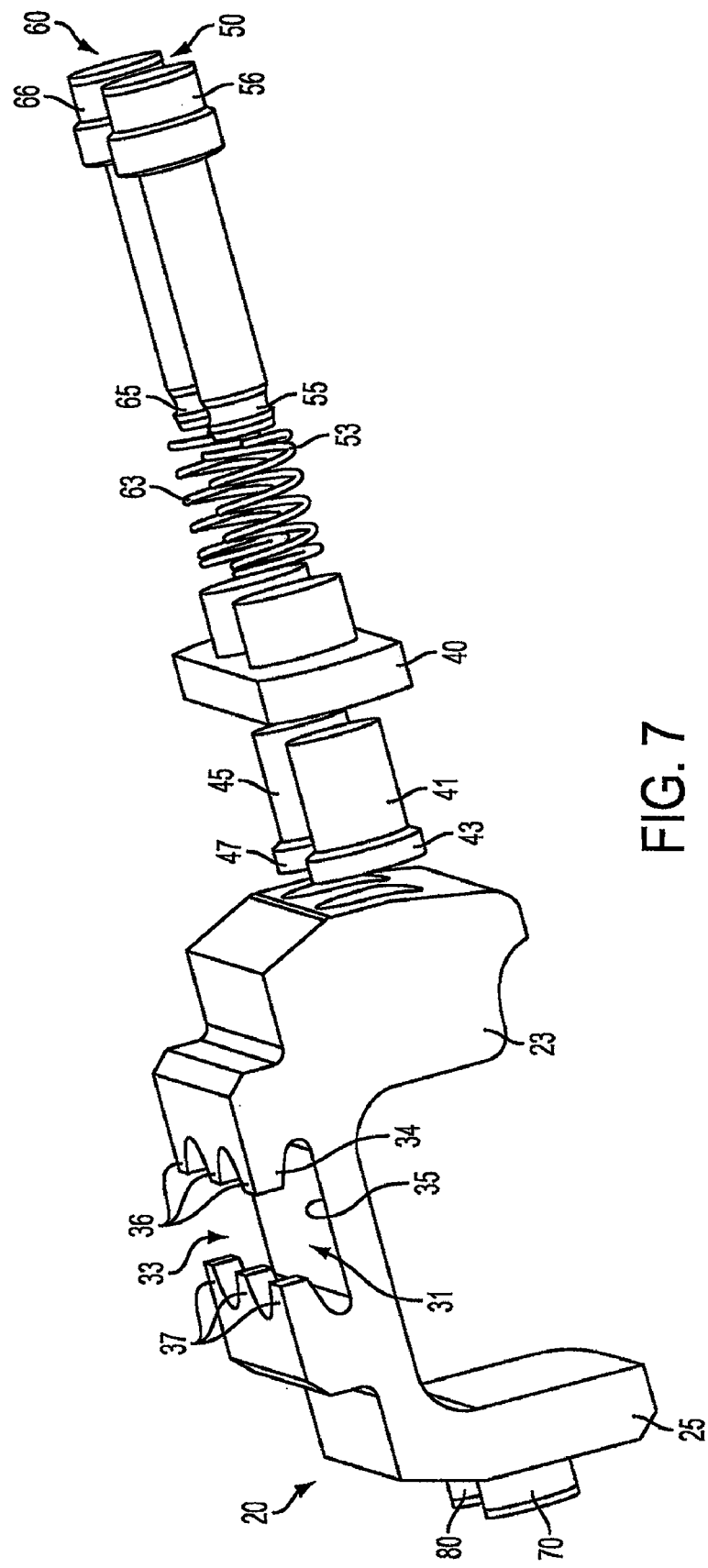
FIG. 7 is an exploded perspective view of a tie down.

As shown in FIGS. 6 and 7, first 50 and second 60 moveable protruding elements can work cooperatively with handle 40. For the purposes of clarity, a first moveable protruding element 50 and its cooperation with handle 40 will be discussed, however its configuration and operation can be applied to second movable protruding element 60 or as many moveable protruding elements as desired. A first moveable protruding element 50 can have two ends, a securing end 55 and an engaging end 56. The securing end 55 extends into cavity 51 through first side wall 23 into handle 40 and secured to the interior of first pull cap 41. Within cavity 51, a spring 53 encircles first moveable protruding element 50 and applies a force against both cavity wall 52 and engaging end 56 of moveable protruding element 50. A first pull cap 41 can have a first pull cap ridge 43 that engages the outer surface of a handle 40. As discussed above, second protruding elements 60 can be similarly configured. Thus, first 50 and second 60 moveable protruding elements can be secured to first 41 and second 45 pull caps which engage handle 40. A user can apply a force orthogonal to handle 40 towards opposing second side wall 25 which pulls movable protruding elements 50 and 60 through the first side wall 23 into a retracted position. Springs 53 and 63 counter the force exerted on handle 40, upon removal movable protruding elements 50 and 60 return to an engaged position, extending past the outer surface of first side wall 23.

A user can retract handle 40 pulling first 50 and second 60 moveable protruding elements approximately below or flush with the outer surface of first side wall 23. So positioned, carriage 22 can be placed in roller tray 10. Upon placement of carriage 22 in roller tray 10, handle 40 can be released, allowing moveable protruding elements 50 and 60 to engage roller tray 10. First 50 and second 60 moveable protruding elements can be retracted by hand operation without the use of tools of mechanical fasteners. Handle 40, first 41 and second 45 pull caps can be formed from a variety of thermoplastic and thermoset materials. A preferable material can be nylon.

First 50 and second 60 movable protruding elements can have an engaging ends (56, 66) in any form of a projection extending out from the surface of a first side wall 23. For example, movable protruding elements 50 and 60 can have engaging ends 56 and 66, that can be a cylinder, cone, frustocone, pyramid, frustopyramid, a cuboid, cube, semi-sphere or a dome.

The inventors contemplate other methods to maintain first 50 and second 60 moveable protruding elements in an engaged position through first side wall 23 and roller tray 10. In one embodiment, a latch can be rotatably attached to the side of a carriage 22 to secure handle 40 and thus moveable protruding elements 50 and 60 in an engaged position. In yet another embodiment, a carriage can have a pivotable side wall, the side wall having fixed protruding elements to engage the roller tray 10.

As described above, second side wall 25 opposes and can be parallel to first side wall 23 of carriage 22. Extending out from second side wall 25 can be first 70 and second 80 fixed protruding elements. First 70 and second 80 fixed protruding elements can engage openings 18 on second rail 16 of roller tray 10. Fixed protruding elements 70 and 80 can be any projection extending out from the surface of second side wall 25. For example, first 70 and second 80 fixed protruding elements 70 and 80 can be a cylinder, cone, frustocone, pyramid, frustopyramid, a cuboid, cube, semi-sphere or a dome. First 70 and second 80 fixed protruding elements can be removably fixed to second side wall 25 using screws, fasteners, bolts or the like. In another embodiment, first 70 and second 80 fixed protruding elements form a single integral structure with second side wall 25 of carriage 22. First 70 and second 80 fixed protruding elements can be positioned at approximately the same height above the base of second side wall 25 of carriage 22. The distance between first 70 and second 80 fixed protruding elements can be about equal to the distance between two adjacent openings 18 on a second rail 16 of roller tray 10. The height of first 70 and second 80 fixed protruding elements above the base of second side wall 25 can be about equal to the height of the openings 18 on a second rail 16 above roller tray base 12.

Figure 8A:
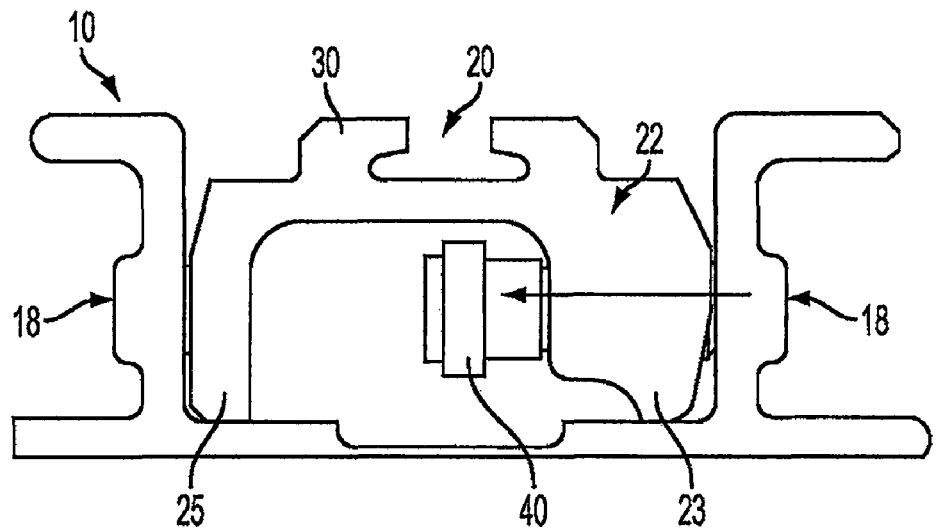
FIGS. 8A, 8B, 8C and 8D show the removal of a tie down from a roller tray.
Figure 8B:
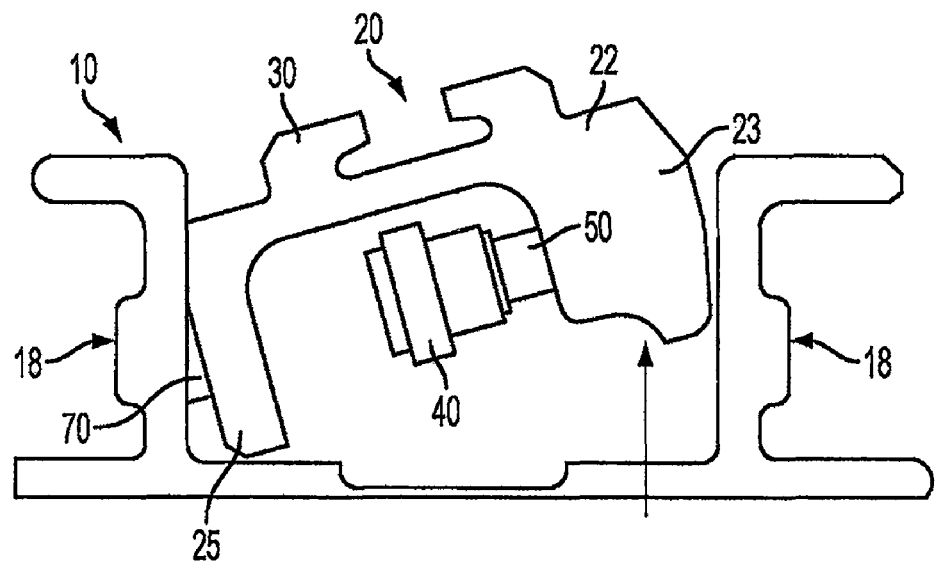
Figure 8C:
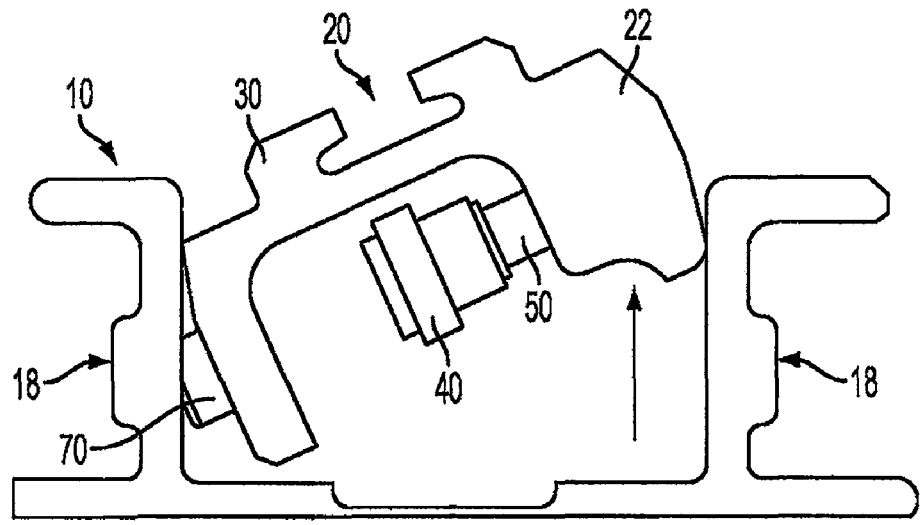
Figure 8D:
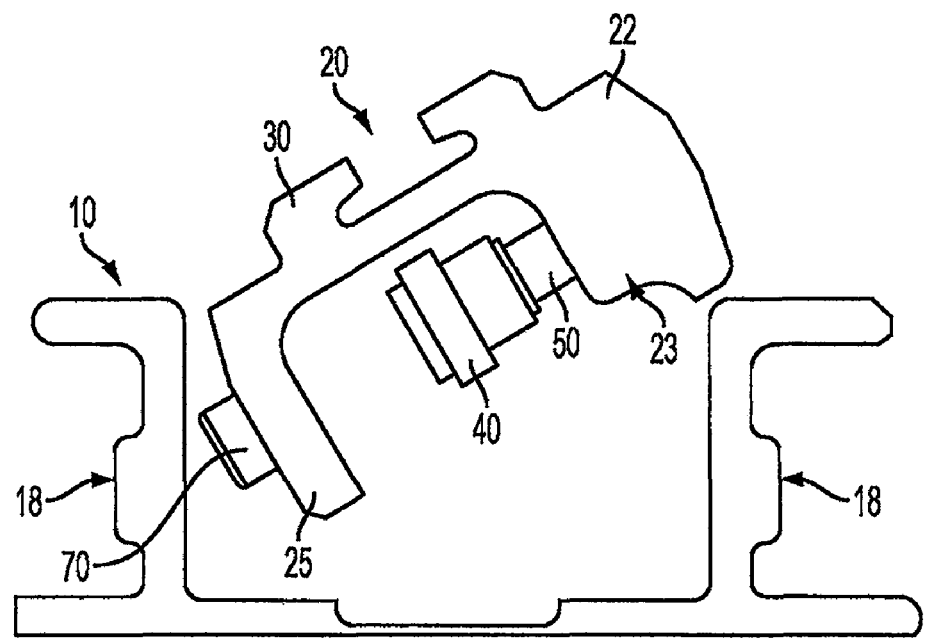

As shown in FIGS. 8A, 8B, 8C and 8D, tie down 20, carriage 22, fitting 30 and protruding elements 50, 60, 70 and 80 removably secure a restraint to a selected location along roller tray 10. Removably securing tie down 20 to a selected location along roller tray 10 can be completed by hand operation carriage 22 without the use of tools of mechanical fasteners can be placed in roller tray 10 by pulling handle 40 towards the second side wall 25 retracting movable protruding elements 50 and 60 approximately flush with the outer surface of first side wall 23. Retracted movable protruding elements 50 and 60 facilitate placement of carriage 22 in a roller tray 10. As fixed protruding elements 70 and 80 engage openings 18 on second rail 16, first side wall 23 of carriage 22 can be placed adjacent to first rail 14. Handle 40 can be released, springs 53 and 63 pushing first 50 and second 60 (not shown) moveable protruding elements through a first side wall 23 and openings 18 of first rail 14. Thus, protruding elements engage roller tray 10 by hand operation and without the use of tools or mechanical fasteners. As shown in FIG. 8A, carriage 22 and protruding elements 50 and 60 (70 and 80 not shown) engage openings 18 on first 14 and second 16 rails of roller tray 10. A user can slide handle 40, towards a first side wall 23 disengaging first 50 and second 60 (not shown) moveable protruding elements from openings 18. As shown in FIGS. 8C and 8D, by pulling carriage 22 in an upwardly direction from roller tray base 12, fixed protruding elements 70 and 80 are disengaged from openings 18 on second rail 16.

Figure 9:
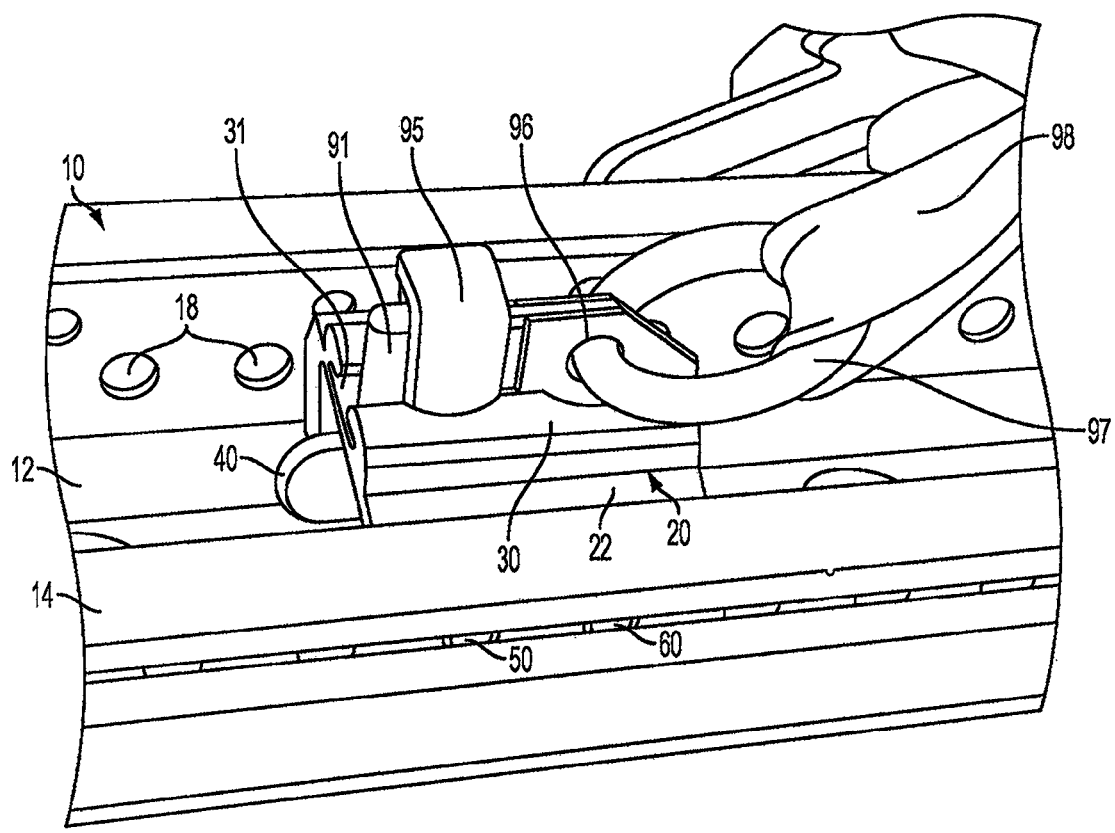
FIG. 9 is a perspective view of strap engaged with a tie down in a roller tray.

Tie down 20 can secure a variety of restraints to roller tray 20. For example, a restraint can include a chain, rope, cord, braid, cable, tie or a strap 98. An embodiment is shown in FIG. 9 where a fitting 30 on tie down 20 removably secures strap 98 to roller tray 10. Fitting 30 receives a strap 98 through an engaging apparatus 90. A ring opening 96 positioned on engaging apparatus 90 receives a ring 97. Strap 98 encircles a portion of ring 97 securing a stowed ULD to engaging apparatus 90 and fitting 30. Strap 98 can be adjusted to increase tension between the engaging apparatus 90 and the ULD for stowage and shipment.

As shown in FIG. 9, engaging apparatus 90 can have first 91 and second 92 studs extending downwardly to engage a track 31 of tie down 30. The track 31, first 91 and second 92 studs can conform to Military Specification 33601, May 1988 Revision, wherein the shape and profile of track 31 and studs (91, 92) are incorporated herein by reference. First and second studs (91, 92) comprise a main and disc portions. A main portion extends from the engaging apparatus 90 with a disc portion distal to the main portion opposite engaging apparatus 90. A disc portion can have a diameter greater than the main portion. However, first and second studs (91, 92) correspond to track 31 of fitting 30. The distance between first 91 and second 92 studs approximates the distance between two consecutive fitting openings 32 on a fitting 30. So positioned, the first fitting openings 32 can receive first 91 and second 92 studs of engaging apparatus 90. Engaged inside fitting openings 32, engaging apparatus 90 can be laterally moved so that the disc portion of first 91 and second 92 studs are positioned under first 36 and second 37 retaining tabs and upper surface 34 of track 31.

An engaging apparatus 90 can include a shear stud 95, as is known in the art. A shear stud 95 has an opening designed to receive a portion of engaging apparatus 90. As the engaging apparatus 90 is moved into a position where first 91 and second 92 studs engage track 31 and retaining tabs 36 and 37, a shear stud 95 can be placed over engaging apparatus 90 and into the remaining area available in fitting openings 32. Because shear stud 95 can be positioned within consecutive retaining tabs 36 and 37 of tie down 30, shear stud 95 minimizes lateral movement of engaging apparatus 90 inside track 31. So positioned, lateral movement of engaging apparatus 90 over carriage 22 and thus roller tray 10 can be minimized, and a stowed ULD can be removably secured to a selected location along a roller tray 10.

A method of using a tie down 20 in a roller tray 10 is also an aspect of the invention. A ULD can be loaded onto a cargo deck. An installation point for carriage 22 can be identified in a roller tray 10. As shown in FIGS. 8A, 8B, 8C and 8D, carriage 22 can be removably secured to a selected installation point in roller tray 10 by first pulling handle 40 to retract moveable protruding elements 50 and 60. Fixed protruding elements 70 and 80 can engage openings 18 on a second rail 16 of roller tray 10. A first side wall 23, with retracted moveable protruding elements 50 and 60, can be positioned adjacent to a first rail 14 of roller tray 10. A handle 40 can be released to engage moveable protruding elements 50 and 60 with 15 openings 18 of first rail 14 of roller tray 10. A restraint can be secured to fitting 30 on carriage 22. During unloading of a shipment a ULD, a restraint can be disengaged from fitting 30. As shown in FIG. 8A handle 40 can be pulled towards second side wall 25, retracting moveable protruding elements 50 and 60, just above, below, or flush with the outer surface of first side wall 23. With moveable protruding elements 50 and 60 retracted, or partially retracted, carriage 22 can be lifted upwardly from roller tray 10, as shown in FIGS. 8B, 8C and 8D.

The above descriptions of various embodiments of the invention are intended to describe and illustrate various elements and aspects of the invention. Persons of ordinary skill in the art will recognize that certain changes and modifications can be made to the described embodiments without departing from the scope of the invention. All such changes and modifications are intended to be within the scope of the appended claims.

We claim:

1. A tie down for securing objects in an aircraft having a roller tray, the tie down comprising:
   a carriage having at least one side wall;
   a fitting on the carriage for removably securing a restraint to the carriage, the fitting comprising a track and at least two spaced apart fitting openings formed in an upper surface of the track, the fitting openings being connected to one another by a gap defined in the upper surface by retaining tabs; and
   at least one protruding element movable between:
      an extended position in which the at least one protruding element protrudes from said at least one side wall and engages the roller tray so as to secure the carriage to a selected location along the roller tray; and
      a retracted position in which the at least one protruding element no longer engages the roller tray, thereby allowing the carriage to be removed from the roller tray.

2. The tie down as in claim 1, further comprising a first protruding element that is movable through the at least one side wall and through an opening on the roller tray.

3. The tie down as in claim 1, wherein the carriage has a first side wall and a second side wall opposing the first side wall, and a second protruding element is removably fixed to the second side wall.

4. The tie down as in claim 2, wherein the carriage has a first side wall and a second side wall opposing the first side wall, and a second protruding element, the second protruding element and the second side wall form an integral structure.

5. The tie down as in claim 1, being removable vertically from a roller tray.

6. The tie down as in claim 1, whereby no removable fasteners are used in removably securing the carriage within the roller tray.

7. A tie down for securing objects in an aircraft having a roller tray, the tie down comprising:
   a carriage having at least one side wall; and
   a fitting on the carriage for removably securing a restraint to the carriage, the fitting comprising a track and at least two spaced apart fitting openings formed in an upper surface of the track, the fitting openings being connected to one another by a gap defined in the upper surface by retaining tabs;
   the carriage being removably secured to an opening formed on a side wall of the roller tray and capable of being secured or removed by hand operation.

8. The tie down as in claim 7, wherein the carriage has a first side wall and a second side wall, and a first protruding element extends from the first side wall and a second protruding element extends from the second side wall, the first and second protruding elements cooperating with the roller tray to removably secure the carriage to a selected location along the roller tray.

9. The tie down as in claim 8, wherein a first protruding element is movable through the first side wall and the roller tray.

10. The tie down as in claim 8, wherein a second protruding element is fixed to the second side wall.

11. The tie down as in claim 8, wherein a second protruding element and the second side wall form an integral structure.

12. The tie down as in claim 7, being vertically removable from a roller tray.

13. The tie down as in claim 7, whereby no removable fasteners are used in securing the carriage within the roller tray.

14. A tie down for securing objects in an aircraft having a roller tray, the tie down comprising:
a carriage having at least one side wall;
a fitting on the carriage for removably securing a restraint to the carriage, the fitting comprising a track and at least two spaced apart fitting openings formed in an upper surface of the track, the fitting openings being connected to one another by a gap defined in the upper surface by retaining tabs; and
a means for removably securing the carriage to a selected location along a side wall of the roller tray, the means located on the at least one side wall of the carriage.

15. The tie down as in claim 14, being removable vertically from a roller tray.

16. The tie down as in claim 14, wherein the removably securing means is movable through the at least one side wall of the carriage.

17. The tie down as in claim 14, wherein the removably securing means is capable of engaging the roller tray.

18. The tie down as in claim 14, whereby no removable fasteners are used in securing the carriage within the roller tray.

19. A method for securing a tie down in an aircraft having a roller tray, the method comprising:
providing a tie down having a carriage and a fitting on the carriage, the fitting comprising a track and at least two spaced apart fitting openings formed in an upper surface of the track, the fitting openings being connected to one another by a gap defined in the upper surface by retaining tabs, the carriage further having a fixed protruding element and a moveable protruding element;
positioning the tie down atop the roller tray with the fitting openings facing upward;
inserting the tie down such that the fixed protruding element engages a first opening within the roller tray;
positioning the movable protruding element to a retracted position such that the carriage is positioned within the roller tray; and
positioning the movable protruding element to an extended position such that the moveable protruding element engages a second opening within the roller tray to releaseably secure the tie down within the roller tray.

20. The method of claim 19, whereby the moveable protruding element engages the second opening within the roller tray to releaseably secure the tie down.

21. The method of claim 19, further comprising securing a restraint to the fitting on the carriage.

22. The tie down as in claim 1, wherein the at least one protruding element is at least partially retracted into the at least one side wall, when in the retracted position.

23. The tie down as in claim 1, comprising:
at least two spaced apart protruding elements protruding from said at least one side wall in a common first direction; and
a manually operable handle member operatively connected to the at least two protruding elements and configured to move the at least two spaced apart protruding elements simultaneously, from the extended position to the retracted position.

24. A tie down for securing objects in an aircraft having a roller tray, the tie down comprising:
a carriage having first and second side walls facing in opposite directions;
a fitting on the carriage for removably securing a restraint to the carriage;
a first pair of protruding elements which are spaced apart from one another, protrude from the first side wall in a common first direction, and are movable between an extended position and a retracted position;
a second pair of protruding elements which are spaced apart from one another, protrude from the second side wall in a common second direction which is opposite to the first direction; and
a manually operable handle member configured to simultaneously move the first pair of protruding elements in the second direction, from the extended position to the retracted position.

25. The tie down according to claim 24, wherein:
the fitting comprises a track extending along a length of tie down, and at least two spaced apart fitting openings formed in an upper surface of the track.

26. The tie down according to claim 24, wherein:
the second pair of protruding elements are removably fixed to the second sidewall.

* * * * *